United States Patent
Scribano et al.

(10) Patent No.: US 9,474,017 B2
(45) Date of Patent: Oct. 18, 2016

(54) METHOD AND APPARATUS FOR CONTROLLING NETWORK SELECTION

(75) Inventors: Gino A. Scribano, St. Charles, IL (US); James A. Marocchi, Winfield, IL (US)

(73) Assignee: MOTOROLA SOLUTIONS, INC., Chicago, IL (US)

(*) Notice: Subject to any disclaimer, the term of this patent is extended or adjusted under 35 U.S.C. 154(b) by 916 days.

(21) Appl. No.: 13/485,196

(22) Filed: May 31, 2012

(65) Prior Publication Data
US 2013/0324124 A1 Dec. 5, 2013

(51) Int. Cl.
*H04W 48/18* (2009.01)

(52) U.S. Cl.
CPC ................... *H04W 48/18* (2013.01)

(58) Field of Classification Search
CPC .............. H04W 48/08; H04W 48/16; H04W 36/0083; H04W 84/045; H04W 36/0088; H04W 64/00; H04W 88/06; H04W 36/08; H04W 48/18; H04W 36/00; H04W 88/00; H04W 88/10; H04W 36/0066; H04W 36/18; H04W 76/007; H04W 36/10
USPC ...................... 455/436, 435.3, 442
See application file for complete search history.

(56) References Cited

U.S. PATENT DOCUMENTS

| | | | |
|---|---|---|---|
| 6,522,881 B1 * | 2/2003 | Feder et al. | 455/437 |
| 7,293,088 B2 | 11/2007 | Douglas et al. | |
| 7,596,194 B2 | 9/2009 | Janky | |
| 7,812,766 B2 | 10/2010 | Leblanc et al. | |
| 7,844,266 B2 | 11/2010 | Jeyaseelan et al. | |
| 8,073,441 B1 | 12/2011 | Unger | |
| 2007/0004404 A1 | 1/2007 | Buckley et al. | |
| 2007/0115899 A1 | 5/2007 | Ovadia et al. | |
| 2007/0135080 A1 * | 6/2007 | Islam et al. | 455/343.1 |

(Continued)

FOREIGN PATENT DOCUMENTS

| | | | | |
|---|---|---|---|---|
| EP | 1798998 A1 | 6/2007 | | |
| EP | 1835780 A2 | 9/2007 | | |
| EP | 2326121 A1 | 5/2011 | | |
| WO | WO 2009/054702 A1 * | 4/2009 | | H04B 7/26 |
| WO | 2010054391 A2 | 5/2010 | | |

OTHER PUBLICATIONS

International Search Report and Written Opinion for counterpart International Patent Application No. PCT/US2013/040578 mailed Oct. 23, 2013.

(Continued)

*Primary Examiner* — George Eng
*Assistant Examiner* — Jing Gao
(74) *Attorney, Agent, or Firm* — Daniel R. Bestor

(57) ABSTRACT

Disclosed are methods and systems for controlling network selection between a current wireless network and a higher-priority wireless network. A subscriber station determines, while connected to a current wireless network, whether it is within a coverage area of a higher-priority wireless network and whether a current traffic data load is indicative of lower-priority background traffic or higher-priority foreground traffic. Responsive to determining that it is within the coverage area of the higher-priority wireless network and that the current traffic data load is indicative of lower-priority background traffic, the subscriber station halts at least the lower-priority background traffic for a predetermined amount of time sufficient to effect a release of a radio resource control (RRC) connection with the current wireless network and searches for and connects to the higher-priority wireless network.

20 Claims, 4 Drawing Sheets

(56) References Cited

U.S. PATENT DOCUMENTS

| | | |
|---|---|---|
| 2007/0270142 A1 | 11/2007 | Willey et al. |
| 2009/0221277 A1 | 9/2009 | Fomin et al. |
| 2011/0086614 A1 | 4/2011 | Brisebois et al. |
| 2011/0130117 A1 | 6/2011 | Fan et al. |
| 2012/0028637 A1 | 2/2012 | Kashikar et al. |

OTHER PUBLICATIONS

Bourke, P., "Determining if a point lies on the interior of a polygon," Nov. 1987, accessed at http://paulbourke.net/geometry/insidepoly/, pp. 6.

"Access Network Discovery and Selection Function (ANDSF) Management Object (MO)," 3GPP specification: 24.312, accessed at http://www.3gpp.org/ftp/Specs/html-info/24312.htm, accessed on Oct. 1, 2012, pp. 2.

"Converting from longitude\latitude to Cartesian coordinates," stack overflow, accessed at http://stackoverflow.com/questions/1185408/converting-from-longitude-latitude-to-cartesian-coordinates, accessed on Oct. 1, 2012, pp. 3.

"Universal Geographical Area Description (GAD)," 3GPP specification: 23.032, accessed at http://www.3gpp.org/ftp/Specs/html-info/23032.htm, accessed on Oct. 1, 2012, pp. 2.

* cited by examiner

METHOD AND APPARATUS FOR CONTROLLING NETWORK SELECTION

FIELD OF THE DISCLOSURE

The present disclosure relates generally to communication systems and more particularly to a method and apparatus for controlling network selection between a current network and an available higher-priority network in a communication system.

BACKGROUND

Wireless communication systems provide for radio communication links to be arranged within the system between a plurality of user terminals. Such user terminals may be mobile and may be known as "mobile stations," "subscriber stations," or "user equipment." At least one other terminal, e.g. used in conjunction with subscriber stations, may be a fixed network equipment, e.g. a control terminal, base station, repeater, eNodeB, and/or access point. Such a system typically includes a system infrastructure which generally includes a network of various fixed terminals, which are in direct radio communication with the subscriber stations. Each of the base stations operating in the system may have one or more transceivers which may, for example, serve subscriber stations in a given local region or area, known as a "cell" or "site," by radio frequency (RF) communication. The subscriber stations that are in direct communication with a particular fixed terminal are said to be served by the fixed terminal. In one example, all radio communications to and from each subscriber station within the system is made via respective serving fixed terminals. Sites of neighboring fixed terminals in a wireless communication system may be offset from one another or may be non-overlapping or partially or fully overlapping.

Wireless communication systems may operate according to an industry standard protocol such as, for example, the Project 25 (P25) standard defined by the Association of Public Safety Communications Officials International (APCO), or other radio protocols, the TETRA standard defined by the European Telecommunication Standards Institute (ETSI), the Digital Private Mobile Radio (dPMR) standard also defined by the ETSI, the Digital Mobile Radio (DMR) standard also defined by the ETSI, the Long Term Evolution (LTE) standard defined by the 3GPP, or the High Rate Packet Data (HRPD) standard defined by the 3GPP2. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber stations in wireless communication systems such as those set forth above send user communicated speech and data, herein referred to collectively as "traffic information," in accordance with the designated protocol.

Many so-called "public safety" wireless communication systems provide for group-based radio communications amongst a plurality of subscriber stations such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force. Due to the mission critical nature of the target users, such wireless communications system must provide high availability and reliability across varying geographic areas and radio environments.

In addition to public safety wireless communications systems, commercial wireless communications systems may provide services to retail or corporate customers via coverage areas adjacent to the public safety coverage areas, and/or coverage areas that partially or entirely overlap with public safety coverage areas. Public safety subscribers may also use commercial wireless communications systems for personal communications, business operations communications, or other types of communications. Commercial wireless communications systems may be configured, for example, to provide service levels commensurate with one of a plurality of various service package levels purchased by the customer.

Due to the mobile nature of subscriber stations, and the limited coverage range of any particular public safety wireless communications system, a particular public safety subscriber station may periodically or intermittently roam outside of a coverage area of a public safety wireless communications system. In order to address such possibilities, agreements may exist between the public safety wireless communication system operator and the commercial wireless communication system operator that allow the particular public safety subscriber to, at least temporarily, use the services of the commercial wireless communications system until the particular public safety subscriber station is able to move back into coverage of the public safety wireless communications system. Even in those cases where the public safety wireless communications system coverage area and the commercial wireless communications system coverage area overlap, the particular public safety subscriber station may choose to obtain service from the commercial wireless communications system due to, perhaps, insufficient or inconsistent signal quality for communications attempted with the public safety wireless communications system and an improved signal quality available at the commercial wireless communications system.

Situations may arise, however, due to the nature of the public safety subscriber station and its programmed functionality, that the particular public safety subscriber station may remain connected to the commercial wireless communications system and will find it difficult, if not impossible, to move back to the public safety wireless communications system, even when it is available and even when it may have a sufficient or even better signal than the commercial wireless communications system. This may occur, for example, in those protocols such as LTE that maintain an active connection between the subscriber station and the communications system when persistent background data transfers continue to occur, such as in the transmission of periodic location updates often transmitted by public safety subscriber stations to ensure that commanders, dispatchers, and other group members or interested parties are always aware of the public safety subscriber station's most recent location. Similar problems may arise in other protocols and air-interfaces, and for other types of subscriber stations.

Unfortunately, the public safety subscriber station may not be granted the same prioritized signaling permissions, or the same elevated quality of service (QoS) levels, when operating in the commercial wireless communications system that would be granted to it by the public safety wireless communications system, and based on service level packages offered on the commercial wireless communications system, may be granted a lower priority than other commercial subscriber stations operating on the commercial wireless communications system. Furthermore, some agreements provide for remuneration to the commercial wireless communications system operator for any services provided to the particular public safety subscriber station, which could result in substantial charges if the particular public safety subscriber station remains connected to the commercial wireless communications system. Accordingly, there is a need for a solution that would allow the particular public safety subscriber station to selectively detach from the commercial wireless communications system and re-attach to an available public safety wireless communication system (perhaps made available due to movement of the particular public safety subscriber station or due to improved radio environments), thereby improving service quality provided to the particular public safety subscriber station and reducing the charges incurred while roaming in the commercial wireless communications system.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
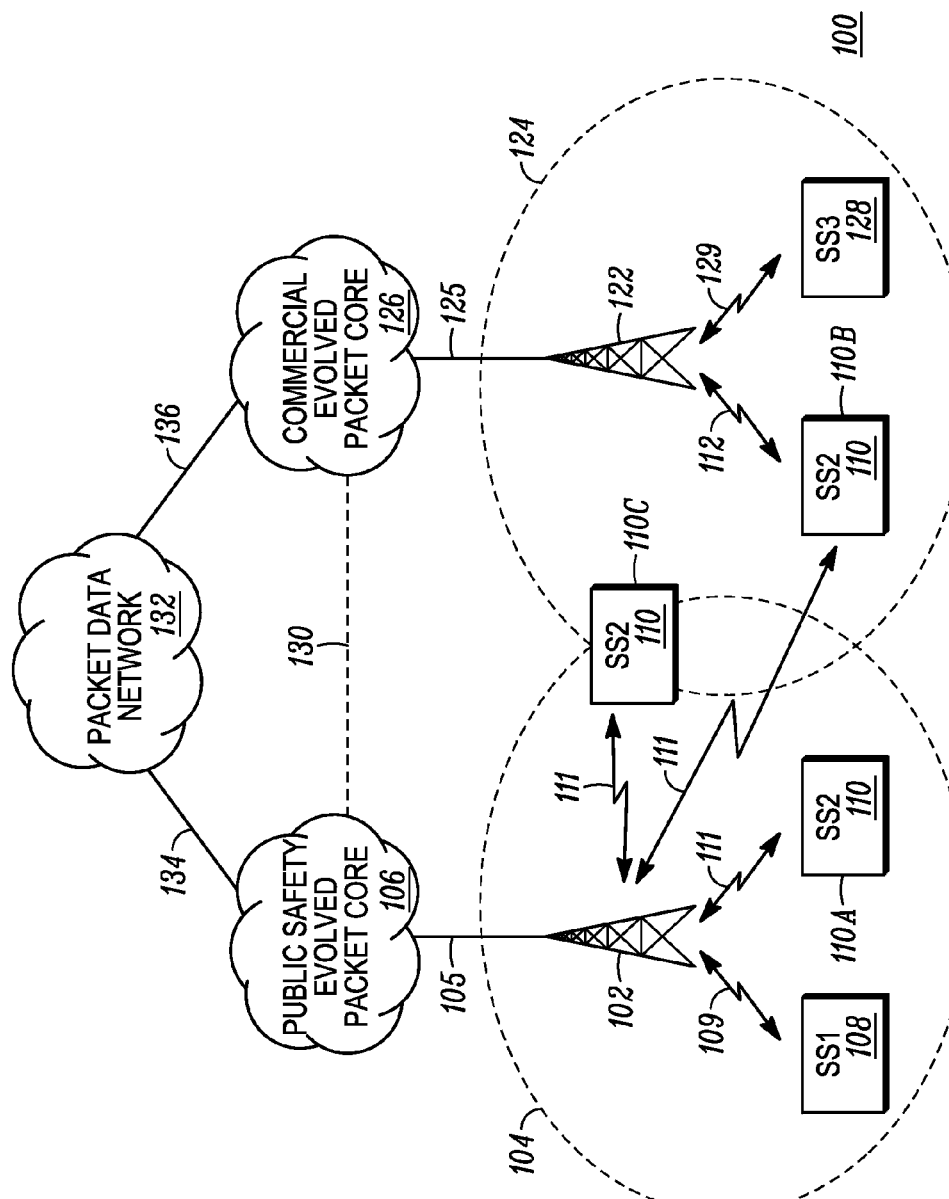
FIG. 1 is a block diagram of a communication system including a lower-priority commercial wireless communications network and a higher-priority public safety wireless communications network in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A method and apparatus for controlling network selection between a current network and an available higher-priority network in a communication system is provided herein. In operation, a subscriber station controls network selection between a current wireless network and a higher-priority wireless network. The subscriber station determines, while connected to a current wireless network, whether it is within a coverage area of a higher-priority wireless network and whether a current traffic data load is indicative of lower-priority background traffic or higher-priority foreground traffic. Responsive to determining that it is within the coverage area of the higher-priority wireless network and that the current traffic data load is indicative of lower-priority background traffic, the subscriber station halts at least the lower-priority background traffic for a predetermined amount of time sufficient to effect a release of a radio resource control (RRC) connection with the current wireless network and searches for and connects to the higher-priority wireless network.

The foregoing will be explained in more detail in the following sections, including a description of the communication system structures and devices followed by a description of the timing decisions and methods executed at a subscriber station in accordance with one or more embodiments.

I. Communication System Structures and Devices

FIG. 1 is a block diagram illustrating a communication system 100 in which a method and apparatus for a controlling network selection between a current network and an available higher-priority network in a communication system may be employed.

The communication system 100 comprises a first base station, router, access point, or eNodeB (hereinafter eNodeB) 102 providing wireless coverage in a coverage area 104 consistent with one or more wireless protocols such as, for example, LTE. The eNodeB 102 may be coupled via a wired or wireless connection 105 to a system infrastructure such as an evolved packet core 106. In this example, eNodeB 102 and evolved packet core 106 form part of a public safety wireless communications system and provide higher-priority wireless services to one or more public safety subscriber stations operating within at least the coverage area 104. In other embodiments, the eNodeB 102 and evolved packet core 106 may be associated with another type of wireless communication system, including, for example, a communication system associated with a particular division of government, a particular division of the military, a particular type of organization, or some other entity that may need similar access to higher-priority communications services. The eNodeB 102, in cooperation with the evolved packet core 106, may establish bearer channels over which communications are exchanged with subscriber stations within its associated coverage area 104, perform admission control, provide traffic prioritization between individual data flows of a single subscriber station and/or between data flows of different subscriber stations, and provide connectivity to other infrastructure devices in the evolved packet core 106 and/or packet data network 132.

The public safety evolved packet core 106 may include one or more infrastructure devices including, for example, a serving gateway (S-GW), a mobile management entity (MME), a home subscriber server (HSS), a Policy and Charging Rules Function (PCRF), and a packet data network (PDN) gateway (P-GW). The S-GW may function to route and forward data packets, while also acting as a mobility anchor for the user data plane during inter-eNodeB handovers and as the anchor for mobility between LTE and other 3GPP technologies, among other possibilities. The MME may function to track and page idle subscriber stations, authenticate subscriber stations (via interactions with the HSS), enforce subscriber station roaming restrictions, and handle security, key management, among other possibilities. The HSS may provide a central database that contains user-related and subscription-related information and may aid in subscriber station system roaming, call and session establishment support, user authentication and access authorization. The PCRF may function to provide charging and credit control for user data flows, and may provide for QoS assignments to user data flows. The P-GW may function to provide connectivity from the served subscriber stations to external packet data networks (in packet data network 132) by being the point of exit and entry of traffic for the subscriber stations. The P-GW may also be involved in performing policy enforcement, packet filtering, and charging support. Fewer or more, and other types of, infrastructure devices may also be present and/or incorporated into the evolved packet core 106.

The eNodeB 102 has radio links with a plurality of subscriber stations, particularly subscriber stations in the coverage area 104 that is at least partially defined by a geographic location of the eNodeB 102. In addition to subscriber stations, eNodeB 102 may maintain separate direct links with other eNodeB's. Two subscriber stations SS1 108 and SS2 110 are illustrated in FIG. 1 as being within the coverage area 104 of, and being registered with, eNodeB 102 via respective radio links 109 and 111. In one embodiment, the eNodeB 102 serves subscriber stations including SS1 108 and SS2 110 with radio communications to and from other terminals, the other terminals including (i) other subscriber stations served by the eNodeB 102, (ii) subscriber stations served by other eNodeBs such as eNodeB 122, and (iii) other subscriber stations at other radio sites (not shown) operably linked to the eNodeB 102 via the evolved packet core 106 and/or packet data network 132. As illustrated in FIG. 1, subscriber stations may roam between coverage areas in communications system 100, and in particular, SS2 110 may roam from its initial location 110A squarely within coverage area 104 to a second location 110B squarely within coverage area 124 and finally to a final location 110C that is within an overlapping coverage area between coverage areas 104 and 124. This movement of subscriber device 110 will be discussed in more detail below.

The communication system 100 further comprises a second base station, router, access point, or eNodeB (hereinafter eNodeB) 122 providing wireless coverage in a coverage area 124 consistent with one or more wireless protocols such as, for example, LTE. The eNodeB 122 may be coupled via a wired or wireless connection 125 to a system infrastructure such as an evolved packet core 126. In this example, eNodeB 122 and evolved packet core 126 form part of a commercial wireless communications system (e.g., operated by a commercial wireless service provider) and provides lower-priority wireless services to one or more public safety subscriber stations operating within the coverage area 124 (e.g., lower-priority with respect to the public safety communications system including eNodeB 102 and associated coverage area 104). In other embodiments, the eNodeB 122 and evolved packet core 126 may be associated with another type of wireless communication system, including, for example, a communication system associated with a particular division of government, a particular type of organization (for example, charitable or retail), or some other entity that may not need access to higher-priority communications services. The eNodeB 122, in cooperation with the evolved packet core 126, may establish bearer channels over which communications are exchanged with subscriber stations within its associated coverage area 124, perform admission control, provide traffic prioritization between individual data flows of a single subscriber station and/or between data flows of different subscriber stations, and provide connectivity to other infrastructure devices in the evolved packet core 126 and/or packet data network 132.

The commercial evolved packet core 126 may, similar to the public safety evolved packet core 106, include one or more infrastructure devices including, for example, a S-GW, a MME, a HSS, a PCRF, and a P-GW. Each of the S-GW, MME, HSS, PCRF, and P-GW in the commercial evolved packet core 126 may provide the same or similar functions and services as the corresponding infrastructure devices in the public safety evolved packet core 106. Fewer or more, and other types of, infrastructure devices may also be present and/or incorporated into the evolved packet core 126.

The eNodeB 122 has radio links with a plurality of subscriber stations, particularly subscriber stations in the coverage area 124 that is at least partially defined by a geographic location of the eNodeB 122. In addition to subscriber stations, eNodeB 122 may maintain separate direct links with other eNodeB's associated with other operators in the communications system 100. Two subscriber stations SS2 110 and SS3 128 are illustrated in FIG. 1 as being within the coverage area of, and being registered with, eNodeB 122 via respective radio links 112 and 129. In particular, the subscriber station SS2 110 is registered with eNodeB 122 only while at or near position 110B. In one embodiment, the eNodeB 122 serves subscriber stations including SS2 110 and SS3 128 with radio communications to and from other terminals, the other terminals including (i) other subscriber stations served by the eNodeB 122, (ii) subscriber stations served by other eNodeBs such as eNodeB 102, and (iii) other subscriber stations at other radio sites (not shown) operably linked to the eNodeB 122 via the evolved packet core 126 and/or packet data network 132.

The public safety evolved packet core 106 and the commercial evolved packet core 126 may communicate directly via wired or wireless connection 130, or indirectly via wired or wireless connections 134, 136 with packet data network 132. The packet data network 132 may include one or more of private networks, public networks, such as the Internet, wireless networks, such as satellite and cellular networks, local area networks (LANs), wide area networks (WANs), telephone networks, such as the Public Switched Telephone Networks (PSTN), or a combination of such networks.

It is to be understood that the communication system 100 is only a logical representation of connections between an infrastructure 106, 126, a number of access point eNodeB's 102, 122, an external packet data network 132, and a plurality of subscriber stations 108, 110, and 128, and represents only one possible arrangement of interconnected communications elements. For example, the communication system 100 can be extended to include additional eNodeBs or groups of eNodeBs and corresponding overlapping or non-overlapping coverage areas. Furthermore, each coverage area may include less than or more than the number of subscriber stations illustrated in the example set forth in FIG. 1.

Figure 2:
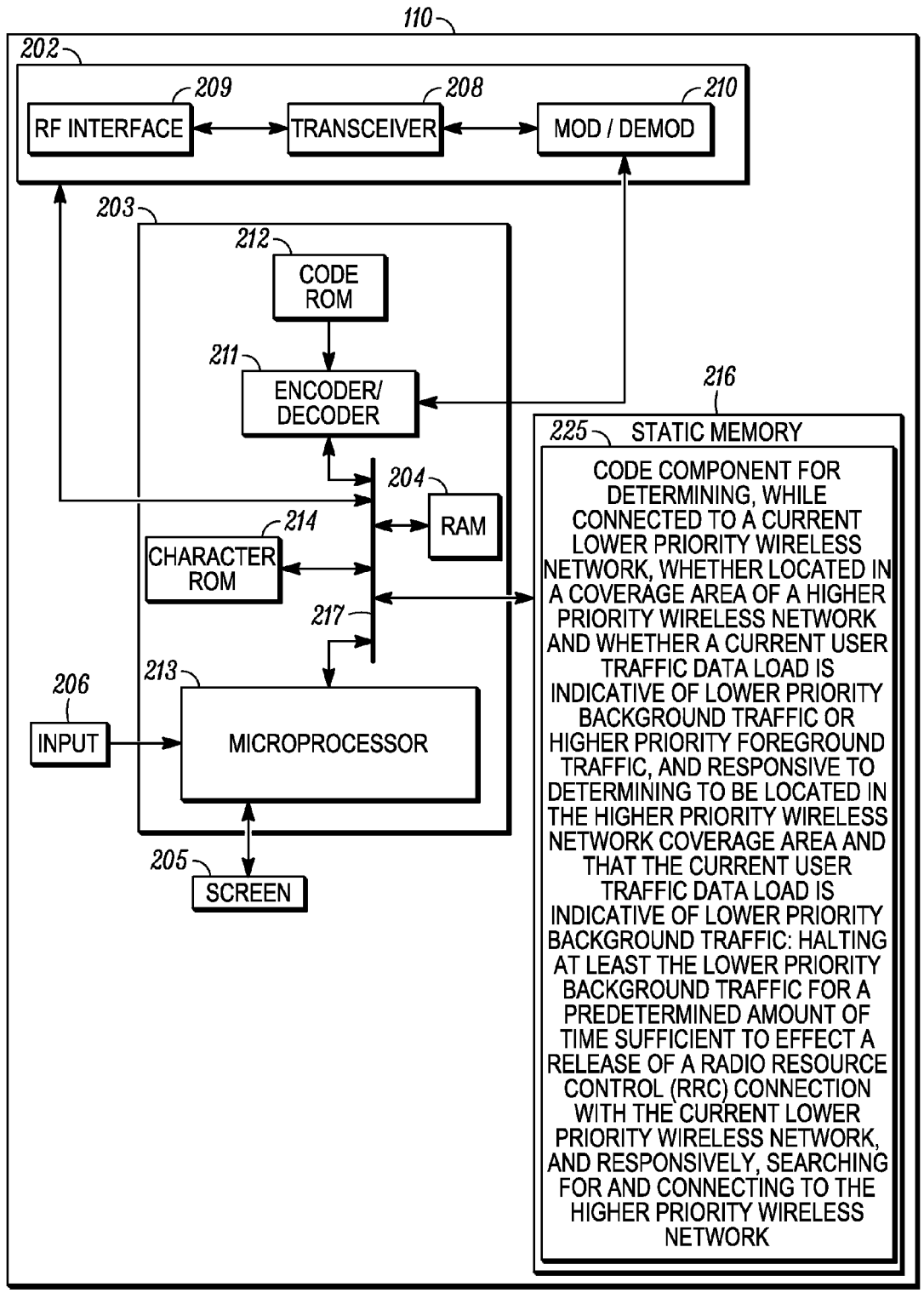
FIG. 2 is a block diagram illustrating further detail of a subscriber station that may be employed in the communication system shown in FIG. 1 in accordance with an embodiment.

FIG. 2 is a block diagram of a subscriber station such as subscriber station SS2 110 operating within the system 100 of FIG. 1 in accordance with some embodiments. Other subscriber station such as subscriber station SS1 108 and SS3 128 may contain same or similar structures. As shown in FIG. 2, subscriber station SS2 110 includes a communications unit 202 coupled to a common data and address bus 217 of a processing unit 203. The subscriber station SS2 110 may also include an input unit (e.g., keypad, pointing device, etc.) 206 and a display screen 205, each coupled to be in communication with the processing unit 203. Other changes or additions are possible as well.

The processing unit 203 may include an encoder/decoder 211 with an associated code Read Only Memory (ROM) 212 for storing data for encoding and decoding voice, data, control, or other signals that may be transmitted or received between eNodeBs or other subscriber stations in the same radio site as eNodeB 102, or perhaps between other eNodeBs or subscriber stations at one or more remote radio sites. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include an RF interface 209 configurable to communicate with other subscriber stations such as subscriber stations SS1 108 and SS3 128 and with eNodeBs such as eNodeBs 102 and 122. The communications unit 202 may include one or more wireless transceivers 208, such as an LTE transceiver, a DMR transceiver, an APOCO P25 transceiver, a TETRA transceiver, a Bluetooth transceiver, a Wi-Fi transceiver perhaps operating in accordance with an IEEE 802.11 standard (e.g., 802.11a, 802.11b, 802.11g, 802.11n), a WiMAX transceiver perhaps operating in accordance with an IEEE 802.16 standard, and/or other similar type of wireless transceiver configurable to communicate via a wireless network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding data such as control channel messages and/or data or voice messages that may be transmitted or received by the subscriber station SS2 110. Static memory 216 may store operating code for the microprocessor 213 that, when executed, determines, while connected to a current lower-priority wireless network, whether located in the coverage area of a higher-priority wireless network, determines whether a current traffic data load is indicative of lower-priority background traffic or higher-priority foreground traffic, responsive to the subscriber station determining to be located in the higher-priority wireless network coverage area and that the current traffic data load is indicative of lower-priority background traffic: halting at least the lower-priority background traffic for a predetermined amount of time sufficient to effect a release of a radio resource control (RRC) connection with the current wireless network, and responsive to determining that the RRC connection with the current lower-priority wireless network has been terminated, searching for and connecting to the higher-priority wireless network, in accordance with one or more of FIGS. 3-4 and corresponding text. The microprocessor 213 may include one or more microprocessors, microcontrollers, DSPs (digital signal processors), state machines, logic circuitry, or any other device or devices that process information based on operational or programming instructions, such as the operating code stored in static memory 216. Static memory 216 may comprise, for example, a hard disk drive (HDD), an optical disk drives such as a compact disk (CD) drive or digital versatile disk (DVD) drive, a solid state drive (SSD), a tape drive, a flash memory drive, or a tape drive, to name a few.

II. Higher-Priority Network Selection

Figure 3:
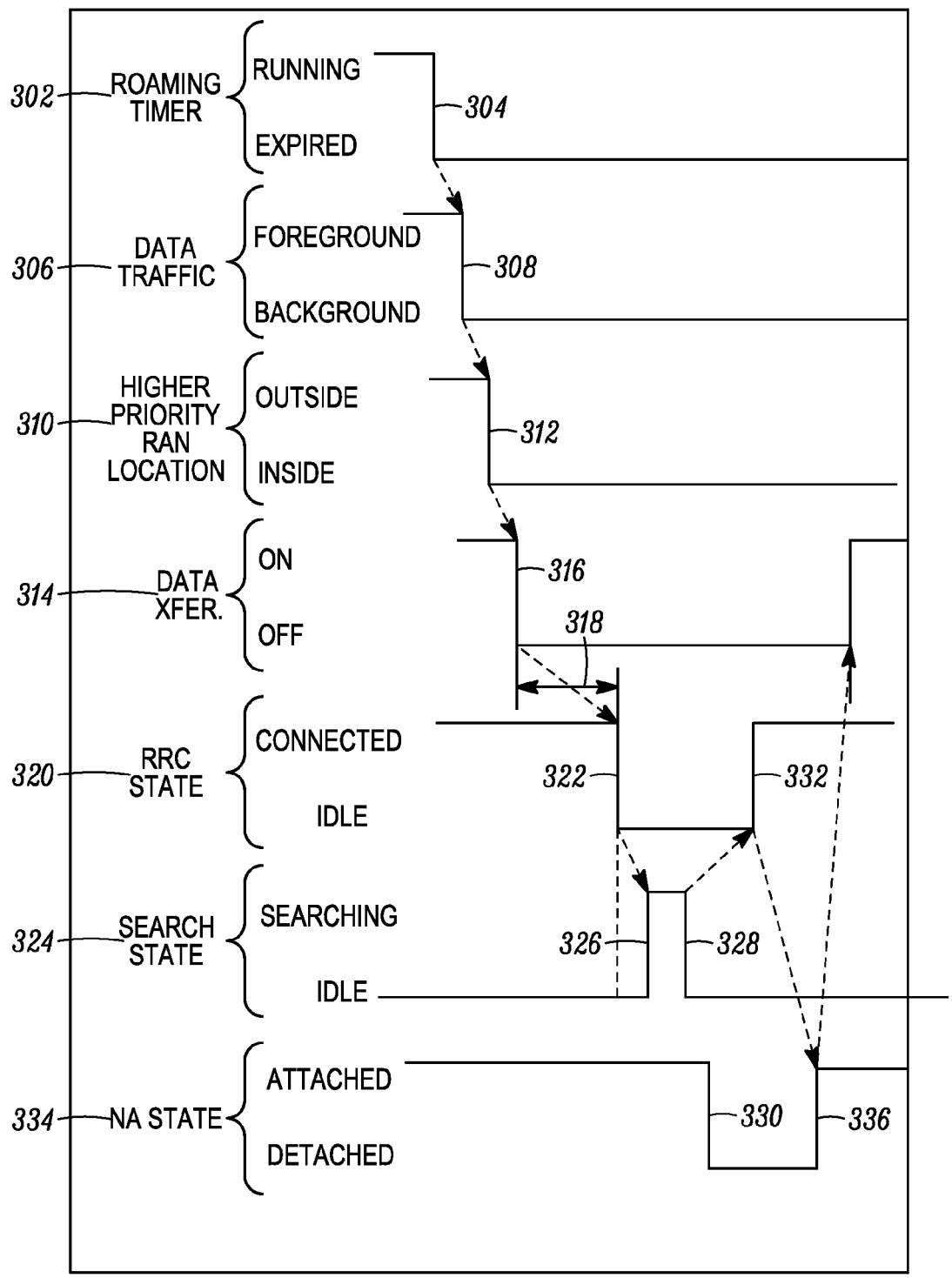
FIG. 3 is a timing diagram illustrating a timing for controlling network selection between a lower-priority network and an available higher-priority network in a communication system in accordance with an embodiment.

FIG. 3 is a timing diagram illustrating a timing 300 for controlling network selection between a lower-priority network (e.g., the commercial wireless communications system of FIG. 1) and an available higher-priority network (e.g., the public safety wireless communications system of FIG. 1) in accordance with an embodiment. The state of a subscriber station in which the timing diagram of FIG. 3 may be executed is after attachment and registration to a lower-priority network and prior to attachment and registration with a higher-priority network. In the example of FIG. 1, this subscriber station state may occur at some point between the position 110B of subscriber station SS2 110 and position 110C of subscriber station SS2 110. For example, the subscriber station SS2 110 may have roamed from position 110A to position 110B and, perhaps due to the unavailability of its previous connection 111 with higher-priority eNodeB 102 or an unacceptable error rate or signal to noise ratio (SNR) of the previous connection, registered with an available commercial eNodeB 122 detected to provide an available or higher quality (e.g., lower error rate or higher SNR) connection 112 compared to the connection 111. As part of the registration process with eNodeB 122, and consistent with the LTE radio resource control (RRC) specification (See 3GPP TS 36.331 V10.4.0, titled "Evolved Universal Terrestrial Radio Access (E-UTRA), Radio Resource Control (RRC)," dated December 2011), a persistent RRC connection is established between the eNodeB 122 and the subscriber station SS2 110. The RRC protocol provides functionality between the eNodeB and subscriber station including the broadcast of system information (e.g., information for cell selection or reselection, neighboring cell information, common channel configuration information, etc.), paging, frequency availability and handover, security handling (including key/algorithm change), establishment/modification/release of radio bearers, QoS control, recovery from radio link failure, measurement configuration and reporting, and/or several others.

In many cases, a public safety subscriber station and the eNodeB it is connected to will maintain an active RRC connection between them as long as the public safety subscriber station continues to persistently transmit and/or receive data with the eNodeB (e.g., send and/or receive data at a minimum periodic interval). For public safety subscriber stations that persistently transmit information such as location information or keep-alive messages on a regular interval (e.g., every 1-30 seconds on an uplink channel to a location or control server via its serving eNodeB), it may be possible for the RRC connection to remain in an active state indefinitely. Other type of subscriber stations, and other protocols, may establish similar persistent connections due to persistent and/or periodic transmission of data between eNodeBs and subscriber stations.

Furthermore, the LTE RRC specification states that a search for a higher-priority network cannot occur until the subscriber station is in an idle state (e.g., the RRC connection is no longer active), according to the UE Idle Mode Procedures specification 36.304 (See 3GPP TS 36.304 V10.4.0, titled "Evolved Universal Terrestrial Radio Access (E-UTRA); User Equipment (UE) procedures in idle mode," dated December 2011). Other protocols may have similar limits on searching for higher-priority networks. Accordingly, in a situation such as illustrated above with respect to FIG. 1, when the subscriber station SS2 110 attaches to the lower-priority commercial eNodeB 122 at position 110B because of a deteriorating quality or out of range status of wireless connection 111, and then subsequently roams back to within range of the higher-priority public safety eNodeB 102 at position 110C, it will in some cases be prevented from attaching to the higher-priority public safety eNodeB 102 due to the persistence of the RRC connection with the lower-priority commercial eNodeB 122.

FIG. 3 thus sets forth a timing diagram illustrating a timing 300 for controlling network selection between a lower-priority network (e.g., the commercial eNodeB 122 and commercial evolved packet core 126) and an available higher-priority network (e.g., the public safety eNodeB 102 and public safety evolved packet core 106) in accordance with some embodiments by forcing a disconnect of the RRC connection with eNodeB 122 in particular determined situations consistent with this disclosure. A roaming timer 302 may be used by a subscriber station to trigger the subscriber station to conduct a "higher-priority network availability" determination on a periodic basis. For example, the timer may trigger every 1-60 minutes. Once the roaming timer 302 triggers at time period 304, the subscriber station measures data traffic 306 to determine whether lower priority background traffic or higher priority foreground traffic is present and, if necessary, waits until all foreground traffic has stopped (e.g., only background traffic is determined to be present). This determination or measurement may be made in several different ways. For example, the subscriber station may look at the current throughput of outbound and/or inbound traffic and, if below a certain predetermined threshold, conclude that the data traffic is limited to background traffic. The threshold value may change based on user type, network type, time of day, day of week, or some other condition. The threshold may be, for example, between 1 and 10 Kb/s, and may be, for example, approximately 2 Kb/second. So for example, if combined outbound and inbound traffic falls to less than 2 Kb/second, the data traffic 306 may transition from foreground to background at time period 308. If, on the other hand, combined outbound and inbound traffic is measured to be greater than the threshold, the roaming timer could be reset and the subscriber station could wait a period of time to try again, at which time any foreground traffic may have stopped. Other methods of making background/foreground determinations may be used as well, including measuring periodicity of the traffic (e.g., background traffic data may exhibit a regular periodic traffic spike perhaps every 1 to 30 seconds as opposed to non-periodic foreground traffic), consideration of what software module is generating the traffic (e.g., a location module vs. a video streaming module), consideration of packet contents (snooping packet contents to determine packet type—location, video, audio, etc.), consideration of packet source or destination, consideration of a priority parameter (e.g., a DSCP field in an IPv4/IPv6 packet header or QCI value in an LTE service data flow), or some other method.

Next, the subscriber station makes a determination of whether it is within a higher-priority radio access network (RAN) location 104. The subscriber may make this determination by referencing a locally or remotely stored database of higher-priority RAN perimeter locations and/or coverage areas and, using its currently determined location (e.g., via GPS, triangulation, or some other method) to determine whether it is most likely within the coverage area of a higher-priority RAN. Assuming that the subscriber station determines that it is most likely within a higher-priority RAN coverage area, the higher-priority RAN location 104, the Higher Priority RAN Location state variable 310 may transition from "outside" to "inside" state at time period 312. Subscriber stations may maintain a locally-stored table associating known networks with associated priority levels, and may assign unknown networks to a default priority level (e.g., a minimum level or some level below a maximum level). Public safety networks (over which the subscriber station would assumedly be granted a higher guaranteed quality of service) and/or the subscriber's home network may be associated with a maximum priority level. Subscriber stations may then determine, via the look-up table, priorities of available networks based on their geographic location, and compare the priorities to a priority of their current network (also obtained via the look-up table or assigned default priority level if no priority level is found in the look-up table).

Next, the subscriber station starts to halt and/or limit all data transfers indicative of state 314. This may include both uplink transmissions generated by the subscriber station (and thus in control of the subscriber station) and downlink transmissions generated by the SGW (if supported by the SGW and in response to an instruction to do so transmitted by the subscriber station to the MME which further provides instruction to the SGW). The subscriber station may halt further transmissions on the uplink in a number of ways, including simply indicating to software modules that network connection is currently unavailable, instructing supported programs to halt any further transmissions for a period of time or until instructed otherwise, simply discarding the data, or some other means or manner. Once all background traffic sources are halted or prevented from transmitting (and, in some embodiments, downlink transmissions halted or prevented), data transfer state 314 transitions from on to off at time period 316.

Next, the subscriber station waits a period of time 318 for the RRC state 320, reflecting the state of the RRC connection between the subscriber station and the eNodeB, to reflect that the RRC connection has been dropped (e.g., the RRC connection has been idled). The time period 318 may be configurable and vary between networks and/or protocols. After a predetermined amount of idle time (e.g., between 1 and 30 seconds on most networks, assuming no further transmissions by the eNodeB), the RRC state 320 will transition from "connected" to "idle" at time period 322. In some embodiments, the subscriber station itself will determine when the RRC state has gone idle, and in other embodiments, a notice of the RRC state of the RRC connection will be provided to the subscriber station by the eNodeB.

Next, and in accordance with the LTE RRC specification noted above, the newly idled subscriber station can begin searching for higher-priority networks and the search state 324 transitions from idle to searching at time period 326. In the example set forth in FIG. 1, where the subscriber station 110 has moved to position 110C and is back to within an acceptable signal range of eNodeB 102, the subscriber station 110 would connect to the higher-priority eNodeB 102 (perhaps identified earlier as a possible target higher-priority network when the higher-priority RAN location 310 switched from being outside a higher-priority network to inside a higher-priority network) and the search state 324 would subsequently transition from the searching state to the idle state at time period 328. After the search state 324 transitions from the searching state to the idle state, the network attachment (NA) state 334 transitions from attached to detached at time period 330 to reflect the forced idle state of the subscriber station.

A new RRC connection is then established with the higher-priority network and the RRC state 320 transitions from "idle" to "connected" at time period 332. After the RRC connection is established, the NA state 334 transitions from "detached" to "attached" at time period 336 to reflect the successful attachment to the higher-priority network. While FIG. 3 illustrates a particular order of triggering events as one example, other event orders are possible as well. For example, in some embodiments, the higher-priority RAN location 310 transition may occur prior to the data traffic 306 transition. Furthermore, in some embodiments, other triggers besides a roaming timer 302 may cause the subscriber device to consider data traffic 306 conditions and higher-priority RAN location 310 availability including, for example, an externally generated trigger transmitted to and received at the subscriber station, perhaps from an eNodeB signal or a user interface signal.

Figure 4:
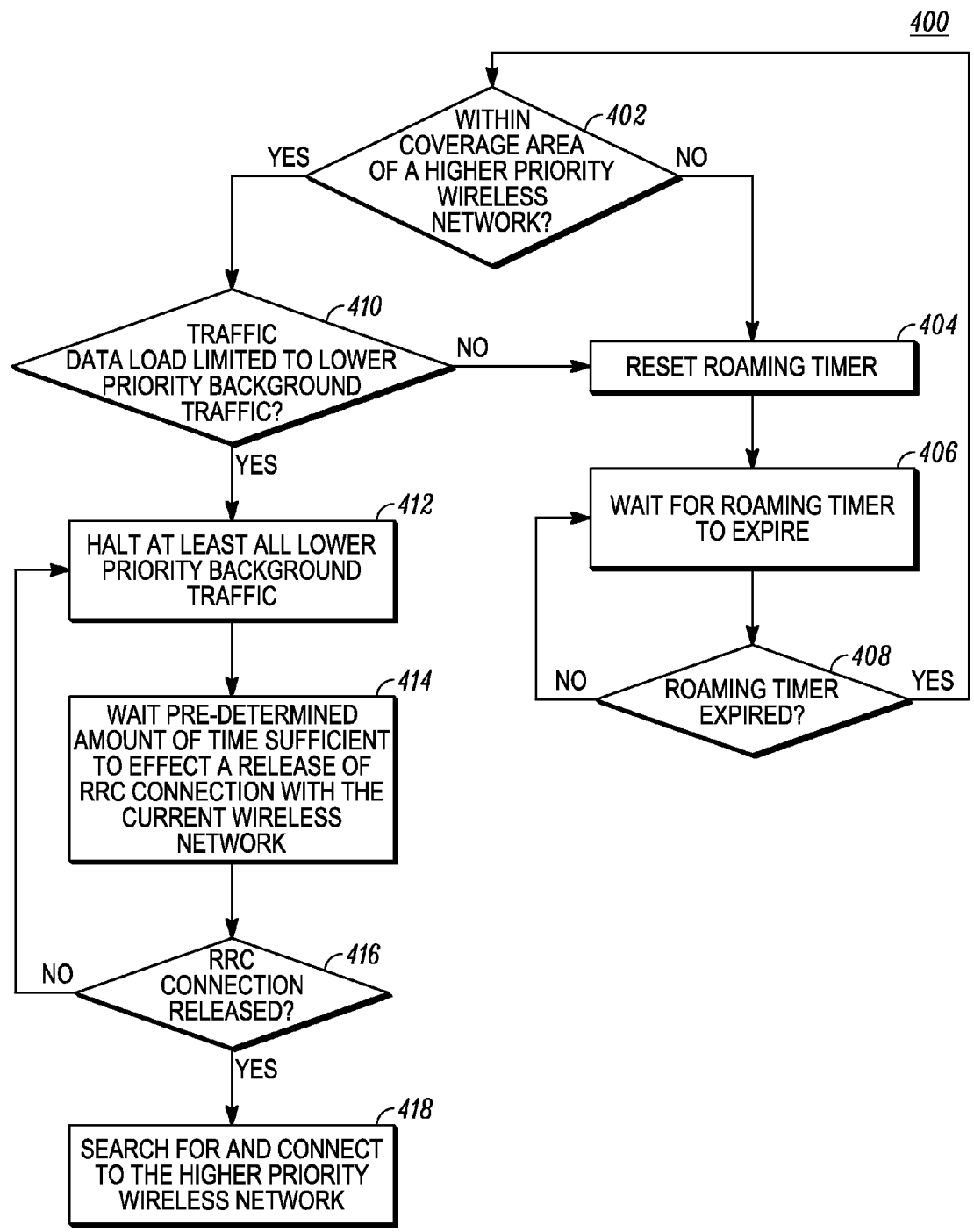
FIG. 4 is a flow chart illustrating an example method, executable at the subscriber station of FIG. 2, for controlling network selection between a lower-priority network and an available higher-priority network in a communication system in accordance with an embodiment.

FIG. 4 sets forth a flowchart illustrating a method 400 of operation by a subscriber station, such as subscriber station 110 of FIG. 1, for controlling network selection between a current lower-priority network and an available higher-priority network in a communication system. Method 400 may be executed at each subscriber station upon initial power-on, upon attachment to a lower-priority network (compared to a maximum possible level or a priority level of a network previously connected to) than possible or previously connected to, after a predetermined amount of time after attachment to a lower-priority network than possible or previously connected to, upon instruction to execute generated by an external device and transmitted to and received at the subscriber station (e.g., perhaps from an eNodeB), or upon the occurrence of some other event. Method 400 may be executed at all subscriber stations in a communication system, or only particular subscriber stations (e.g., at vehicular subscriber modems (VSMs) but not at hand-held two-way radios, or at certain models of two-way radios but not other models, or for certain groups of users of the two-way radios but not for certain other groups of users).

Method 400 begins at step 402, where the subscriber station determines whether a higher-priority wireless network is available (perhaps in one or more of the manners already set forth above). As set forth earlier, subscriber stations may maintain locally-stored tables associating known networks with associated priority levels, and may assign unknown networks to a default priority level (e.g., a minimum level or some level below a maximum level).

If the subscriber station determines that it is most likely not within coverage of a higher-priority network (or could most likely not receive a sufficiently high quality signal of a higher-priority network, based perhaps on distance alone or in combination with received power of known higher-priority eNodeB's determined to be closest to its current geographic location), processing proceeds to step 404 where the subscriber station resets an internal roaming timer (e.g., sets it to zero or sets it to some maximum value from which to count down). Processing then proceeds to step 406 where the subscriber station waits for the roaming timer to expire (e.g., reach a maximum predetermined value or reach a zero value). At step 408, the subscriber station determines whether the roaming timer has expired. If it has not yet expired, processing loops back to step 406. If it is determined that the roaming timer has expired at step 408, processing loops back up to step 402 to again determine whether a higher-priority wireless network is available. Steps 402-408 may be executed continuously at a subscriber station, or may be executed only when it is detected that the subscriber station has attached to a network that is not associated with a maximum priority level.

Returning to step 402, if it is determined that a higher-priority wireless network is most likely available, processing proceeds to step 410. At step 410, the subscriber station determines whether a total traffic data load is limited to lower-priority background traffic, perhaps using one or more of the methods already set forth above. If the subscriber station determines that higher-priority foreground traffic is present (e.g., perhaps by measuring an amount of data being transceived, transmitted, or received, by measuring a periodicity of the transmissions, by identifying a source of the data, determining a priority of the data traffic, or some other method), processing proceeds to step 404 where the roaming timer is reset.

If, however, it is determined at step 410 that only lower-priority background traffic is present, processing proceeds to step 412, where the subscriber station proceeds to halt at least all lower-priority background traffic transmissions. As set forth earlier, the subscriber station may also attempt to halt all lower-priority background traffic receptions at step 410 by transmitting an instruction requesting as much to its serving network. In some embodiments, the subscriber station may also temporarily halt higher priority foreground traffic as well (e.g., all outbound uplink traffic and/or instruct the serving network to halt all inbound downlink traffic) and may provide a visual notification to a user, via a display or LED, that traffic (inbound and/or outbound) is being temporarily halted.

At step 414, the subscriber station waits for a predetermined amount of time sufficient to effect a release of the RRC connection with the serving eNodeB of the current serving wireless network. As set forth earlier, the amount of time that the subscriber station must wait at step 414 may vary between networks and/or protocols, and may vary based on whether any traffic destined for the subscriber station is allowed to be passed through by the eNodeB during the time period. In addition, the amount of time may vary if one or more foreground or higher-priority applications generate data for transmission at the subscriber station during the time period. Generally, this higher-priority foreground data traffic will not be halted in order to avoid a negative impact of services provided to a user of the subscriber station. In cases where the higher-priority foreground data traffic continues for more than a predetermined threshold of time, processing may proceed from step 414 back to step 404 (not shown).

At step 416, the subscriber station determines whether the RRC connection has been released. The subscriber station itself may make the determination, or the subscriber station may be notified of the release of the RRC connection by its serving eNodeB, consistent with the RRC protocol standard If the subscriber station determines that the RRC connection has not yet been released, processing loops back to step 412 where the subscriber station continues to halt or prevent at least all lower-priority background traffic transmissions. If, on the other hand, the subscriber station determines at step 416 that the RRC connection has been released, processing proceeds to step 418, where the subscriber station searches for and (assuming it finds the higher-priority network), connects to and authenticates with the higher-priority wireless network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, or article that comprises, has, includes, contains a list of elements does not include only those elements but may include other elements not expressly listed or inherent to such process, method, or article. An element proceeded by "comprises . . . a", "has . . . a", "includes . . . a", "contains . . . a" does not, without more constraints, preclude the existence of additional identical elements in the process, method, or article that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling network selection between a current wireless infrastructure network and a higher-priority wireless infrastructure network, the method comprising:
   a subscriber station determining, while connected to the current wireless infrastructure network, whether it is within a coverage area of the higher-priority wireless infrastructure network;
   the subscriber station determining whether a current traffic data load is indicative of lower-priority background data traffic or higher-priority foreground data traffic; and
   responsive to the subscriber station determining that it is within the coverage area of the higher-priority wireless infrastructure network and that the current traffic data load is indicative of lower-priority background data traffic:
   the subscriber station halting at least the lower-priority background data traffic for a predetermined amount of time sufficient to effect a release of a radio resource control (RRC) connection with the current wireless infrastructure network; and
   responsive to determining that the RRC connection with the current wireless infrastructure network has been terminated, searching for and connecting to the higher-priority wireless infrastructure network.

2. The method of claim 1, wherein the steps of determining whether the subscriber station is within the coverage area of the higher-priority wireless infrastructure network and of determining whether a current traffic data load is indicative of lower-priority background data traffic or higher-priority foreground data traffic are executed periodically based on a roaming timer maintained at the subscriber station.

3. The method of claim 1, wherein the current wireless infrastructure network is a lower-priority commercial Long Term Evolution (LTE) network and the higher-priority wireless infrastructure network is a public safety LTE network.

4. The method of claim 1, further comprising the subscriber station, responsive to determining that the higher-priority wireless infrastructure network has become available and that the current traffic data load is indicative of lower-priority background data traffic, halting all outbound traffic for the predetermined amount of time sufficient to effect the release of the RRC connection with the current wireless infrastructure network.

5. The method of claim 1, further comprising, prior to halting at least the lower priority background data traffic for the predetermined amount of time sufficient to effect the release of the RRC connection with the current wireless infrastructure network, transmitting a request to the current wireless infrastructure network to halt any further transmission of inbound traffic data to the subscriber station for at least the predetermined amount of time.

6. The method of claim 1, wherein the predetermined amount of time is between 1and 60minutes.

7. The method of claim 1, wherein the subscriber station determining that the current traffic data load is indicative of lower-priority background data traffic comprises determining that an amount of current traffic data load is less than a predetermined threshold level.

8. The method of claim 1, wherein the subscriber station determining that the current traffic data load is indicative of lower-priority background data traffic comprises determining that the current traffic data load has a regular periodic traffic spike at a defined interval.

9. The method of claim 1, wherein determining that the RRC connection with the current wireless infrastructure network has been terminated comprises the subscriber station receiving notification from the current wireless infrastructure network that the RRC connection has been terminated.

10. The method of claim 1, wherein the halted lower-priority background data traffic comprises one of location updates and keep-alive messages.

11. The method of claim 1, wherein determining whether the subscriber station is within the coverage area of the higher-priority wireless infrastructure network comprises indexing into a database of higher-priority public safety network coverage areas using a determined current geographic location of the subscriber station.

12. The method of claim 1, further comprising determining, via a database of associated network priority levels, priorities of the current wireless infrastructure network and the higher-priority wireless infrastructure network.

13. The method of claim 1, wherein halting the lower-priority background data traffic comprises one of indicating to software modules that network connection is currently unavailable prior to release of the RRC connection with the current wireless infrastructure network, instructing supported programs to halt any further transmissions of lower-priority background data traffic, and discarding generated lower-priority background data traffic.

14. A subscriber station for controlling network selection between a current wireless infrastructure network and a higher-priority wireless infrastructure network, the subscriber station configured to:
  determine, while connected to the current wireless infrastructure network, whether it is within a coverage area of the higher-priority wireless infrastructure network;
  determine whether a current traffic data load is indicative of lower-priority background data traffic or higher-priority foreground data traffic; and
  responsive to determining that it is within the coverage area of the higher-priority wireless infrastructure network and that the current traffic data load is indicative of lower- priority background data traffic:
    halt at least the lower-priority background data traffic for a predetermined amount of time sufficient to effect a release of a radio resource control (RRC) connection with the current wireless infrastructure network; and
    responsive to determining that the RRC connection with the current wireless infrastructure network has been terminated, search for and connect to the higher-priority wireless infrastructure network.

15. The subscriber station of claim 14, further configured to periodically, based on a roaming timer maintained at the subscriber station, determine whether the subscriber station is within the coverage area of the higher-priority wireless infrastructure network and determine whether a current traffic data load is indicative of lower-priority background data traffic or higher-priority foreground data traffic.

16. The subscriber station of claim 14, wherein the current wireless infrastructure network is a lower-priority commercial Long Term Evolution (LTE) network and the higher-priority wireless infrastructure network is a public safety LTE network.

17. The subscriber station of claim 14 further configured to, responsive to determining that the higher-priority wireless infrastructure network has become available and that the current traffic data load is indicative of lower-priority background data traffic, halt all outbound traffic for the predetermined amount of time sufficient to effect the release of the RRC connection with the current wireless infrastructure network.

18. The subscriber station of claim 14, further configured to, prior to halting at least the lower priority background data traffic for the predetermined amount of time sufficient to effect the release of the RRC connection with the current wireless infrastructure network, transmit a request to the current wireless infrastructure network to halt any further transmission of inbound traffic data to the subscriber station for at least the predetermined amount of time.

19. The subscriber station of claim 14, wherein the subscriber station is configured to determine that the current traffic data load is indicative of lower-priority background data traffic by one of either (i) determining that an amount of current traffic data load is less than a predetermined threshold level, or (ii) determining that the current traffic data load has a regular periodic traffic spike at a defined interval.

20. The subscriber station of claim 14, further configured to determine whether the subscriber station is within the coverage area of the higher-priority wireless infrastructure network by indexing into a database of higher-priority public safety network coverage areas using a determined current geographic location of the subscriber station.

* * * * *